(12) United States Patent
Campagna et al.

(10) Patent No.: US 7,668,786 B2
(45) Date of Patent: *Feb. 23, 2010

(54) METHOD AND SYSTEM FOR ESTIMATING THE ROBUSTNESS OF ALGORITHMS FOR GENERATING CHARACTERIZING INFORMATION DESCRIPTIVE OF SELECTED PRINTED MATERIAL SUCH AS A PARTICULAR ADDRESS BLOCK

(75) Inventors: Matthew J. Campagna, Ridgefield, CT (US); Danny Lelli, Kanata (CA)

(73) Assignee: Pitney Bowes Inc., Stamford, CT (US)

( * ) Notice: Subject to any disclaimer, the term of this patent is extended or adjusted under 35 U.S.C. 154(b) by 1326 days.

This patent is subject to a terminal disclaimer.

(21) Appl. No.: 10/736,268

(22) Filed: Dec. 15, 2003

(65) Prior Publication Data

US 2005/0131718 A1    Jun. 16, 2005

(51) Int. Cl.
    G07B 17/02    (2006.01)
(52) U.S. Cl. ...................................... 705/408
(58) Field of Classification Search ................. 705/408
    See application file for complete search history.

(56) References Cited

U.S. PATENT DOCUMENTS

| | | | |
|---|---|---|---|
| 3,978,457 | A | 8/1976 | Check et al. |
| 4,168,533 | A | 9/1979 | Schwartz |
| 4,222,518 | A | 9/1980 | Simjian et al. |
| 4,226,360 | A | 10/1980 | Simjian et al. |
| 4,301,507 | A | 11/1981 | Soderberg et al. |
| 4,493,252 | A | 1/1985 | Clark |
| 4,579,054 | A | 4/1986 | Buan et al. |
| 4,629,871 | A | 12/1986 | Scribner et al. |
| 4,725,718 | A | 2/1988 | Sansone et al. |
| 4,757,532 | A | 7/1988 | Gilham |
| 4,757,537 | A | 7/1988 | Edelmann et al. |

(Continued)

FOREIGN PATENT DOCUMENTS

EP    0782108    7/1997

(Continued)

OTHER PUBLICATIONS

Mack, Stephen L., "Making a Read on Bar Codes," Managing Office Technology, Cleveland, Jan./Feb. 1998, vol. 43, Iss. 1, p. 34.*

(Continued)

*Primary Examiner*—John W Hayes
*Assistant Examiner*—Nathan Erb
(74) *Attorney, Agent, or Firm*—Ronald Reichman; Angelo N. Chaclas (57) ABSTRACT

A method and system for selecting a characterizing algorithm to be used to characterize blocks of printed material. A digital image of printed material, such as an address block, on an object is obtained, and the image is processed to extract characterizing information descriptive of aspects of the printed material. An indicium representative of the information is then printed on the object. The object's relationship to the indicium can be verified by regenerating the characterizing information from the printed material and comparing the regenerated characterizing information with characterizing information recovered from the indicium. A particular algorithm is selected from a predetermined group of characterizing algorithms by determining an estimate for the robustness of each algorithm.

12 Claims, 7 Drawing Sheets

U.S. PATENT DOCUMENTS

| | | | |
|---|---|---|---|
| 4,775,246 A | | 10/1988 | Edelmann et al. |
| 4,831,555 A | | 5/1989 | Sansone |
| 4,873,645 A | | 10/1989 | Hunter et al. |
| 4,900,903 A | | 2/1990 | Wright et al. |
| 4,907,271 A | | 3/1990 | Gilham |
| 5,448,641 A | | 9/1995 | Pintsov et al. |
| 5,454,038 A | | 9/1995 | Cordery et al. |
| 5,602,382 A | * | 2/1997 | Ulvr et al. ............. 235/462.02 |
| 5,625,694 A | | 4/1997 | Lee et al. |
| 5,675,137 A | * | 10/1997 | van Haagen et al. ... 235/462.07 |
| 5,871,288 A | * | 2/1999 | Ryan et al. ................. 400/103 |
| 6,005,945 A | * | 12/1999 | Whitehouse ................ 380/51 |
| 6,385,504 B1 | * | 5/2002 | Pintsov et al. .............. 700/226 |
| 2001/0040979 A1 | | 11/2001 | Davidson et al. |
| 2003/0053653 A1 | | 3/2003 | Rhoads |

FOREIGN PATENT DOCUMENTS

| | | |
|---|---|---|
| EP | 1544790 A | 6/2005 |
| WO | 00/65541 | 11/2000 |

OTHER PUBLICATIONS

Cullen M. et. al. "Reading Encrypted Postal Indicia", Document Analysis and Recognition, 1995., Proceedings of the Third International Conference on Montreal, Que., Canada Aug. 14-16, 1995, Los Alamitos, CA. USA, IEEE Comput. Soc., US, vol. 2, Aug. 14, 1995, pp. 1018-1023, XP010231073, ISBN: 0-8186-7128-9.

* cited by examiner

METHOD AND SYSTEM FOR ESTIMATING THE ROBUSTNESS OF ALGORITHMS FOR GENERATING CHARACTERIZING INFORMATION DESCRIPTIVE OF SELECTED PRINTED MATERIAL SUCH AS A PARTICULAR ADDRESS BLOCK

RELATED APPLICATIONS

The present application relates to similar subject matter as, and shares elements of disclosure with, commonly assigned application entitled "Method And System For Generating Characterizing Information Descriptive Of Selected Printed Material Such As A Particular Address Block" Ser. No. 10/736,077 in the names of Leon A. Pintsov, Matthew J. Campagna, and Danny Lelli.

BACKGROUND OF THE INVENTION

The subject invention relates to the problem of providing a robust, compact characterization of a block of printed text which will distinguish the selected block of text from other such blocks. More particularly, it relates to the problem of estimating the robustness of algorithms for generating characterizing information descriptive of printed material. (By "robust and compact" herein is meant information which is small enough in quantity to be incorporated into postal indicia yet will identify a text block, and distinguish it from other text blocks, with sufficient reliability to deter "rubber stamp" counterfeiting; despite errors introduced by the printing and/or scanning processes.)

Postage metering systems account for postage and other values such as parcel delivery service charges and tax stamps, and print indicia representative of such values as proof of payment. To protect against counterfeiting of indicia, modern digital postage metering systems use encryption technology. The postage value and other information relating to an indicium are preferably digitally signed, or otherwise cryptographically authenticated, and the information and signature are incorporated into the digital postal indicium.

Digital postal indicia using encryption technologies are extremely secure. In general, without knowledge of the proper encryption keys, it is essentially impossible to produce a counterfeit digital indicium. However, digital indicia are subject, as are all postal indicia, to "rubber-stamp" counterfeiting when a valid indicium is scanned and reproduced on multiple mail pieces. To prevent such "rubber-stamp" counterfeiting, it is known to incorporate information from the address block of the mail piece into the postal indicium. Because space on an envelope is limited, typically only a small portion of the information in the address block will be incorporated into the indicium.

Figure 1:
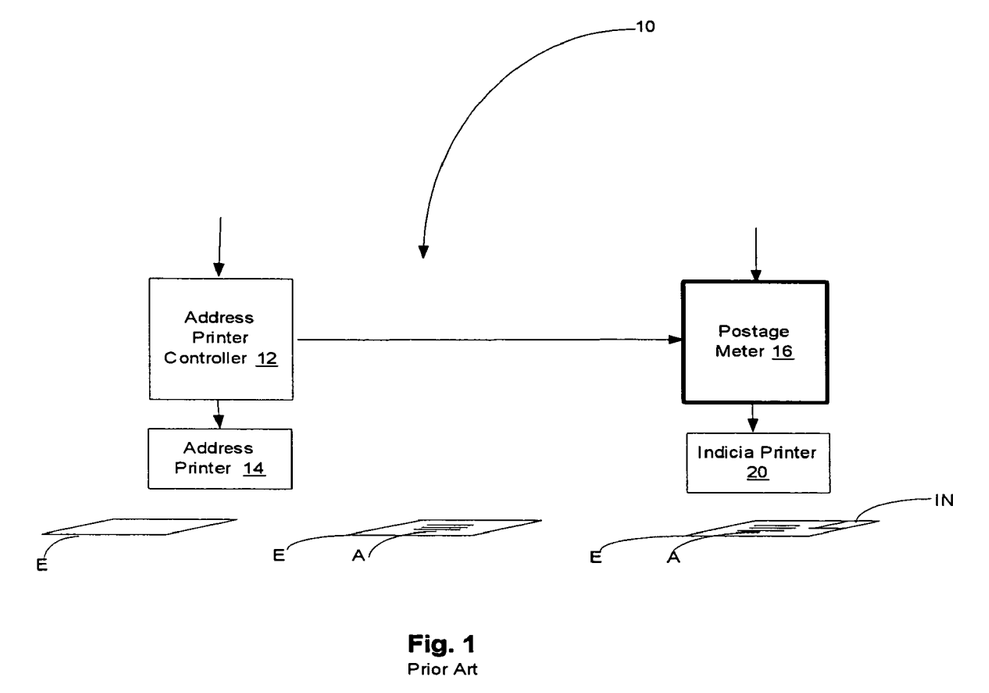
FIG. 1 shows a schematic block diagram of a prior art mailing system.

In FIG. 1, prior art mailing system 10 includes address printer controller 12, address printer 14, postage meter 16, and indicia printer 20. Address printer controller 12 receives address information from a data processing system (not shown), generates a bitmap representative of the nominal, or "pristine", image of the address block, and controls address printer 12 to print address block A, representative of the address, on envelope E. Meter 16 receives postage information, and other information, from the data processing system. Meter 16 also receives characterizing information descriptive of block A from address printer controller 12. The information received can be either text-based or image-based. Text-based information is descriptive of the words or characters making up to the address, (e.g., ASCII code) while image-based information is descriptive of the actual printed image in the address block. Meter 16 combines the characterizing information with the postage value and other information, typically digitally signs the combination, generates a bitmap representative of an indicium including the digitally signed combination, and controls indicia printer 20 to print indicium IN on envelope E. When the mail piece is sent to a postal service location the address block can be scanned again, and the information regenerated from the scanned address block compared to information recovered from indicium IN, without the need to communicate with the remote mailing system; thus tying indicium IN to the particular mail piece. (Note that since indicium IN is cryptographically linked to the address on the mail piece, printer 20 need not be a secure printer; but can be a general purpose printer which can be controlled by other devices for other uses.) Commonly assigned, provisional application No. 60/386,868 filed Jun. 7, 2002, entitled System And Method For Mail Destination Address Information Encoding Protection And Recovery In Postal Payment in the name of Leon A. Pintsov discloses a system similar to that of the FIG. 1 using text-based characterizations of the address block.

While useful for its intended purpose, problems remain with the system of FIG. 1 and similar systems. It has proven difficult to reliably recover textual information from address blocks during the validation process using available optical character recognition (OCR) techniques. Attempts to increase the robustness of text-based systems by incorporation of additional information and/or the use of error correcting codes has resulted in undesirable increases in indicia size and computational complexity. Use of image-based characterizing systems, such as those described in the above mentioned co-pending application Ser. No. 60/386,868, has been proposed and is believed to substantially overcome some of the problems of text-based systems; however, it has proven difficult to form a priori estimates of the robustness of proposed characterizing algorithms for image-based system; forcing users to undertake extensive trial and error testing of various algorithms. This problem is exacerbated by the variation in robustness of characterizing algorithms with respect to the particular text block to be characterized. Thus, it is an object of the present invention to provide a method and system for estimating the robustness of characterizing algorithms with respect to a particular text block.

BRIEF SUMMARY OF THE INVENTION

The above object is achieved and the disadvantages of the prior art are overcome in accordance with the subject invention by a method and system for selecting a characterizing algorithm for generating a characterizing information descriptor for a selected block of printed material when the printed material is to be scanned from an object and compared with the characterizing information descriptor at a location distant from where the block is printed. The system of the subject invention is controlled in accordance with the method of the subject invention to: print the block on an object; apply each algorithm from a predetermined set of characterizing algorithms to a pristine image of the block of printed material to generate a plurality of corresponding first characterizing information descriptors for the block; determine estimates of robustness, with respect to the block of printed material, for each of the algorithms in the set to determine which of the characterizing algorithms is most robust; and select a descriptor generated by the algorithm and being so determined to be most robust to be used at the distant location.

In accordance with one aspect of the subject invention, the estimates are determined by filtering the pristine digital image of the block of printed material with a print/scan filter to create a filtered image, the print/scan filter simulating the expected transformation of the pristine image by printing and scanning processes; applying each algorithm from the predetermined set of characterizing algorithms to the filtered image to generate a plurality of corresponding second characterizing information descriptors for the filtered digital image; and, for each algorithm from the predetermined set of characterizing algorithms, comparing corresponding the first and the second descriptors to determine which of the characterizing algorithms is most robust.

In accordance with another aspect of the subject invention the object is a mail piece and the block of printed material represents an address and the selected descriptor is comprised in an indicium printed on the mail piece; whereby the selected descriptor can be recovered from the indicium for use at the remote location.

In accordance with another aspect of the subject invention the selected descriptor is one of the second descriptors.

In accordance with yet another aspect of the subject invention the estimates are determined by filtering the pristine digital image of the block of printed material with a print/scan filter to create a filtered image, the print/scan filter simulating the expected transformation of the pristine image by printing and scanning processes; further filtering the filtered image with one or more defacing filters, the defacing filters simulating simulate blots, smudges, failure of print elements or scanner sensors, or other, similar occasional events which can not easily be incorporated into the print/scan filter to create one or more defaced images; applying each algorithm from the predetermined set of characterizing algorithms to the filtered image and to the one or more defaced images to generate a plurality of corresponding second characterizing information descriptors for the filtered digital image and one or more pluralities of defaced image descriptors corresponding to each of the one or more defaced images; and for each algorithm from the predetermined set of characterizing algorithms, comparing corresponding first characterizing information descriptors with corresponding second characterizing information descriptors and with each of the one or more corresponding defaced image descriptors to determine which of the characterizing algorithms is most robust.

Other objects and advantages of the present invention will be apparent to those skilled in the art from consideration of the detailed description set forth below and the attached drawings.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF PREFERRED EMBODIMENTS

Figure 2:
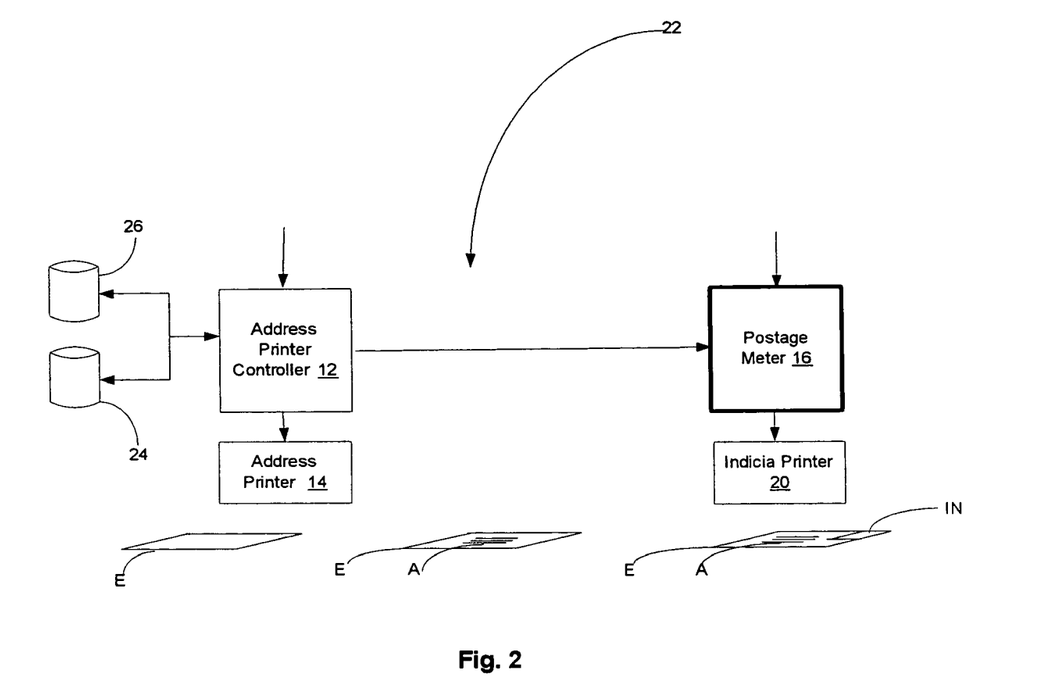
FIG. 2 shows a schematic block diagram of a mailing system in accordance with the subject invention.

In FIG. 2, mailing system 22 includes address printer controller 12, address printer 14, postage meter 16, and indicia printer 20, which are substantially similar to the corresponding prior art elements shown in FIG. 1. System 22 differs in including data stores 24 and 26 communicating with controller 12. Data store 24 stores a plurality of characterizing algorithms, as will be described further below, and data store 26 stores at least a print/scan filter which, when applied to the pristine image, generates a filtered image which approximates the transformation of the pristine image by the printing and scanning processes. In other embodiments, data store 26 stores one or more defacing filters which simulate blots, smudges, failure of print elements or scanner sensors, or other, similar occasional events which can not easily be incorporated into said print/scan filter to create one or more defaced images. Together, meter 16, printer 20, form secure postal indicia printing system 22.

Three methods for generation of image-based characterizing information, which are believed to provide improved compactness and robustness in accordance with the above object of the invention, have recently been developed by the assignee of the present application and are described below as illustrative of the type of characterizing algorithms which can be used with the subject invention. Numerous other algorithms will be apparent to those skilled in the art and particular choices of algorithms to be used form no part of the subject invention, except as may be recited in the claims below and equivalents. Each of these methods is believed to provide a sufficiently high likelihood of detection to deter "rubber stamp" counterfeiting, particularly by large scale mailers, while having a sufficiently low rate of false positives that it will not unduly delay mail processing. It is believed that each of these methods will in general provide characterizing information which can be specified by a bit stream of approximately 6 to 12 bytes.

Figure 3:
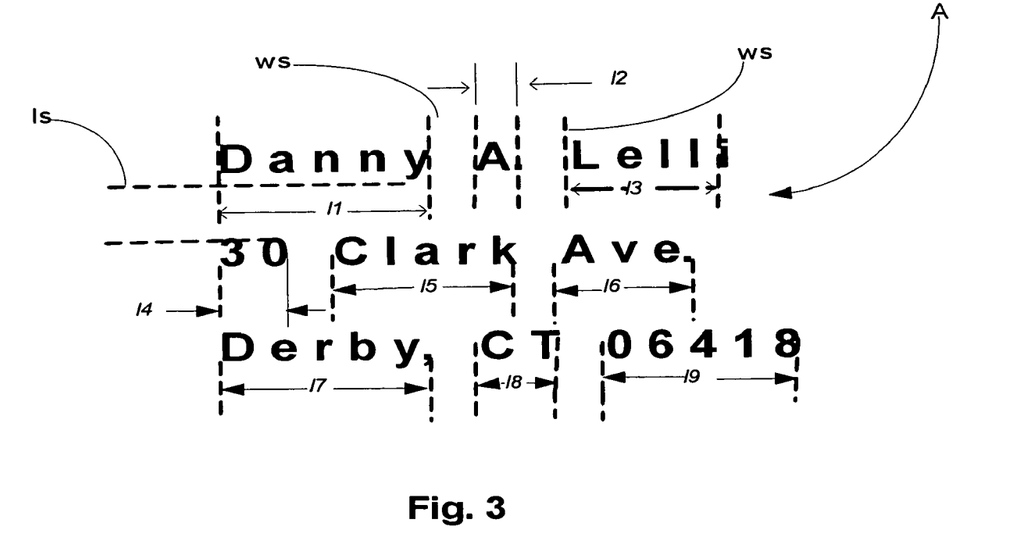
FIG. 3 illustrates a method for abstracting characterizing information descriptive of an address block from an image of the address block.

A characterizing algorithm in which the characterizing information comprises measurements of the lengths of the individual words which make up address A, is shown in FIG. 3. Address block A is parsed to identify individual words by first identifying line spaces Is by determining the occurrence of large amounts of horizontal white space between blocks of printed text, and then identifying word spaces ws by determining the occurrence of large amounts of vertical white space between blocks of printed text (as shown with respect the first line of address A). Word lengths /1 through /9 are then determined for address A. Preferably, word lengths are taken (measured in pixels) from the edges of word spaces ws (or the address edges) as shown, but can be taken in any convenient manner, such as along the midline of the words.

It is believed that using four or fewer bits per word would not be useful in postal applications. Thus, in a preferred embodiment the number of bits used can be selected to encode all words in the address, and two control bits will be sufficient to indicate selection of five to eight bits per word to encode the length of the word. In other embodiments, a fixed number of words in the address, for example the first eight, can be scanned at a fixed number of bits per word; eight in this case, since control bits would not be needed to specify the number of bits per word.

EXAMPLE

Figure 4:
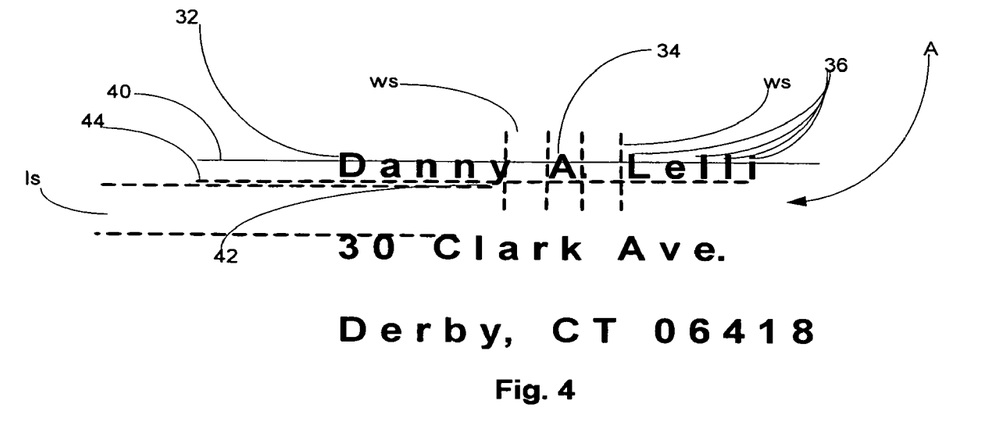
FIG. 4 illustrates another method for abstracting characterizing information descriptive of an address block from an image of the address block.
Figure 5:
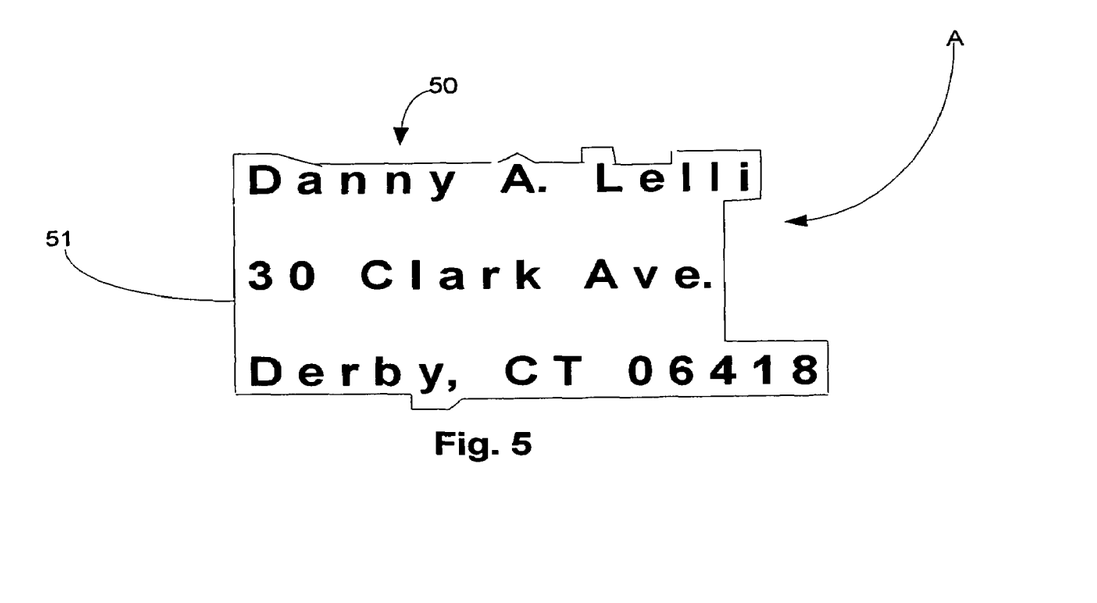
FIG. 5 illustrates another method for abstracting characterizing information descriptive of an address block from an image of the address block.

An address such as shown in FIGS. 3-5 may produce, depending on the print font selected, etc., the following results using six bits per word:

| Word # | 1 | 2 | 3 | 4 | 5 | 6 | 7 | 8 | 9 |
|---|---|---|---|---|---|---|---|---|---|
| Length(pixels) | 173 | 45 | 150 | 60 | 154 | 103 | 168 | 68 | 189 |

The absolute lengths are then normalized to the range 1-63, i.e. $2^0-(2^6-1)$, yielding:

| Word # | 1 | 2 | 3 | 4 | 5 | 6 | 7 | 8 | 9 |
|---|---|---|---|---|---|---|---|---|---|
| Length(normalized) | 56 | 1 | 46 | 7 | 48 | 26 | 54 | 11 | 63 |

Another algorithm in which the characterizing information comprises measurements of the number of "outliers" in each word (or each line) that make up address A, is shown in FIG. 4. (By "outliers" herein is meant ascenders or descenders and portions capitals of which project beyond thresholds, which are preferably determined by the upper and lower bounds of lower case letters without ascenders or descenders, such as "a", "c", "e", etc.) Address A is parsed to identify individual words, if necessary, by first identifying line spaces Is by determining the occurrence of large amounts of horizontal white space between blocks of printed text, and then identifying word spaces ws by determining the occurrence of large amounts of vertical white space between blocks of printed text (as shown with respect the first line of address A). Otherwise, only the lines need be identified.

Assuming six bits are allocated per word, the number of upwards (+) and downwards (−) outliers per word can be encoded as "xxx/yyy" where x and y are binary digits and xxx is the number of (+) outliers and yyy is the number of (−) outliers.

EXAMPLE

Again taking eight bytes as the space allocated for the address block characterizing information, as shown in FIG. 4 with respect to the first address line, (+) outliers 32, in word 1; 34, in word 2; and 36, in word 3 are identified as exceeding threshold 40, and outlier 42, in word 1, is identified as exceeding threshold 44. Since for address block A all of the outliers can be encoded in less than 60 bits, the resulting bit stream is:

where code 1 indicates per word characterization and 111 is an end code. (The 111 end code of course implies that no more than six (+) outliers can be recognized in any word, i.e. 110 means 6 or more.)

Another algorithm in which the characterizing information comprises a description of the shape of the address block is shown in FIG. 5. The shape is determined by using a conventional "best fit" scanning algorithm which encloses address block A with "best fit" closed curve 50. (It should be understood that various algorithms for generating a best fit curve will generate different curves. These differences do not affect the subject invention so long as the same algorithm is used to generate the curve whose description is incorporated into the indicium and to recover the curve from the address block when the indicium is validated.) Preferably, curve 50 is constrained. That is the manner in which a curve can be generated and is limited so that the resulting curve is simplified and can be described with limited information. In FIG. 5, curve 50 is formed from linked straight line segments, such as segment 51, which are limited to eight "directions", up (U), down (D), left (L), right 1, up-right (UR), up-left (UL), down-right (DR), and down-left (DL); viewed as being generated starting in the upper left corner of address block A and traveling clockwise around address block A. Preferably, the curve 50 also accounts for spaces between characters, words and lines, treating these spaces as equivalent to printed space, so that curve 50 does not become too convoluted and require extensive descriptive information. It is within the skill of a person skilled in the art to provide an algorithm which will generate robust and compact characterizing information, as described above.

The characterizing information, i.e., the description of curve 50, can be encoded in a number of ways. In the present example, the characterizing information consists of only the directions, without lengths, of each successive line segment.

EXAMPLE

Encoding line segment directions as:
R=000, L=111, U=001, D=110, UR=010, DL=101, DR=011, UL=100; and starting at the upper left of address block A, curve 50 is described by the bit stream:

```
000-011-000-010-011-000-001-000-110-000-001-000-110-111-110-000-110-
 |   |   |   |   |   |   |   |   |   |   |   |   |   |   |   |   |
 R   DR  R   UR  DR  R   U   R   D   R   U   R   D   L   D   R   D 111-110-111-001-111-001-110
 |   |   |   |   |   |   |
 L   D   L   U   L   U   D(end)
```

Thus, curve 50 can be described in nine bytes, including an end code, which can be indicated by reversal (or repetition) of the immediately preceding segment direction. Again, this bit stream is incorporated into the indicium.

Programming of a data processor to analyze scan data to perform imaging operations such as identifying lines and words, measuring the dimensions of letters and words or fitting a curve to an image in accordance with predetermined constraints are well known. Such operations are substantially routine in the character and general pattern recognition arts, for example. Techniques for carrying out such operations are

```
1-001/001-001/000-100/000-010/000-011/000-001/000-010/000-010/000-101/000-111
|      |         |         |         |         |         |         |         |         |       |
code  word1    word2     word3     word4     word5     word6     word7     word8     word9    end
``` also taught in *Handbook of Pattern Recognition and Image Processing* edited by T Young and K-S Fu, Academic Press, 1986, and need not be discussed further here for an understanding of the subject invention.

Bit streams, such as those described above, comprise ordered sequences of values which are typically, though not necessarily, numeric values associated with words in the address block. (Such bit streams are hereinafter sometimes "characterizing information descriptors" or "descriptors", and such values are hereinafter sometimes "characterizations".) As described above, when an indicium is validated, i.e., tied to the mail piece on which it is printed, at a distant postal facility the descriptor generated from the pristine image and incorporated into the indicium is compared with a descriptor recovered from an image scanned from the address block printed on the mail piece. It will be apparent to those skilled in the art that the recovered image will be transformed with respect to the pristine image by the characteristics of the printing and scanning processes, as well as possibly by the occurrence of occasional events such as blots. Thus, it is important that the algorithm used to characterize the address block be robust, that is, that it produce descriptors that match sufficiently when an indicium is valid, and do not match for invalid indicia, despite small differences between the scanned image and the pristine image. It will also be apparent that the robustness of a particular characterizing algorithm can vary for different address blocks. (As a hypothetical example, the above described algorithm based on word length may be less robust for address blocks printed in a small font while algorithms based on the number of outliers, or address block shape may be relatively insensitive to font size.)

Figure 6:
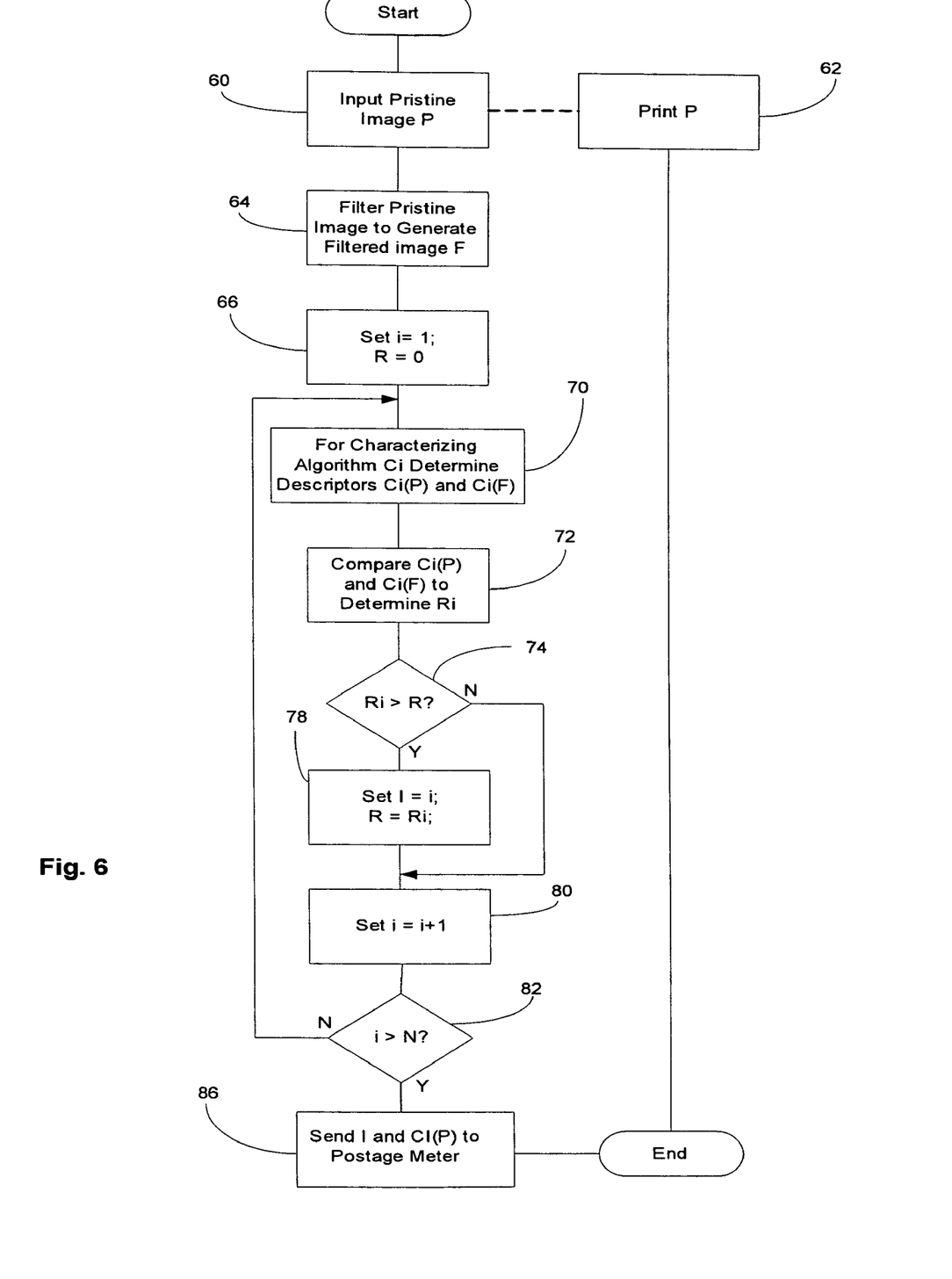
FIG. 6 shows a flow diagram of the operation of a controller comprised in the system of FIG. 2 in accordance with one embodiment of the subject invention.

FIG. 6 shows a flow diagram of the operation of controller 12 in accordance with one embodiment of the subject invention. At step 60 controller 12 obtains a pristine digital image, P, of address block A from a conventional source (not shown) such as a data processing system for preparing a bulk mailing. At step 62 controller 12 carries out printing of address block A in a conventional manner. Preferably, this printing process is carried out concurrently with the selection of a characterizing algorithm but, in other embodiments of the subject invention, printing of address block A can be carried out sequentially or by a separate processor.

At step 64, controller 12 inputs a print/scan filter which simulates the printing process of printer 14 and the scanning process to be carried out at a remote postal facility from data store 26 and applies it to image P to generate a filtered image, F, which approximates the image which will be scanned from the mail piece at the postal facility. And at step 66 sets index i equal to 1 and variable R equal to 0.

At step 70 controller 12 applies the ith characterizing algorithm $C_i$ to images P and F to generate corresponding descriptors $C_i(P)$ and $C_i(F)$; each comprising a sequence of M characterizations, or values, $C_i(P)_1$ through $C_i(P)_M$; $C_i(F)_1$ through $C_i(F)_M$. Then at step 72, controller 12 compares descriptors $C_i(P)$ and $C_i(F)$ to estimate a robustness value $R_i$ for the ith algorithm $C_i$, with respect to a particular image P.

The comparison at step 72 is carried out using a comparison algorithm associated with characterizing algorithm $C_i$ and which preferably is the same comparison algorithm used at the postal facility to compare the descriptor recovered from the scanned image with the descriptor incorporated into indicium IN. Preferably the comparison is carried out on a characterization by characterization basis, comparing each $C_i(P)_j$ with the corresponding $C_i(F)_j$ to determine if the characterizations match; i.e. if they are "close enough" as defined by the particular comparison algorithm used. (As a hypothetical example, where the characterizations are word lengths they may be considered to "match" if the lengths differ by no more than one or two units; while if the characterizations are the number of outliers in a word a "match" may require exact equality.)

In a preferred embodiment, once descriptors $C_i(P)$ and $C_i(F)$ have been compared, an estimate $R_i$ for the robustness of algorithm $C_i$, with respect to particular image P, is calculated as:

$R_i$=Total no. of [$C_i(P)_j$ matching $C_i(F)_j$]/M (for j=1 through M);

where M is the number of characterizations generated by $C_i$. (Note that since robustness is defined with respect to small changes in the image, in normal use the filters, and the printing and scanning processes, will be such that the descriptors $C_i(P)$ and $C_i(F)$ will have the same number of characterizations. Otherwise an error condition is generated.)

Once estimate $R_i$ is determined at step 74 controller 12 determines if $R_i$ is greater than variable R and, if so, at step 78 controller 12 sets R=$R_i$ and index value I=i. Then, or immediately if $R_i$ is not greater than R, at step 80 controller 12 sets i=i+1. At step 82 controller 12 determines if i+1 is greater than N, the number of characterizing algorithms stored. If not, controller 12 returns to step 70 to test the next algorithm. Otherwise, at step 86 controller 12 sends I and descriptor $C_i(P)$ to meter 16 in a conventional manner for incorporation into indicium IN. The postal facility can then use I to identify $C_i$ and use $C_i$ to validate indicium IN in a conventional manner. In other embodiments, descriptors can be self-identified by their format, or, if a relatively small number of algorithms is used, the facility can sequentially test using all algorithms, with the assumption that only the algorithm actually used to generate the descriptor will give meaningful results; so that index value I need not be included in indicium IN.

Figure 7:
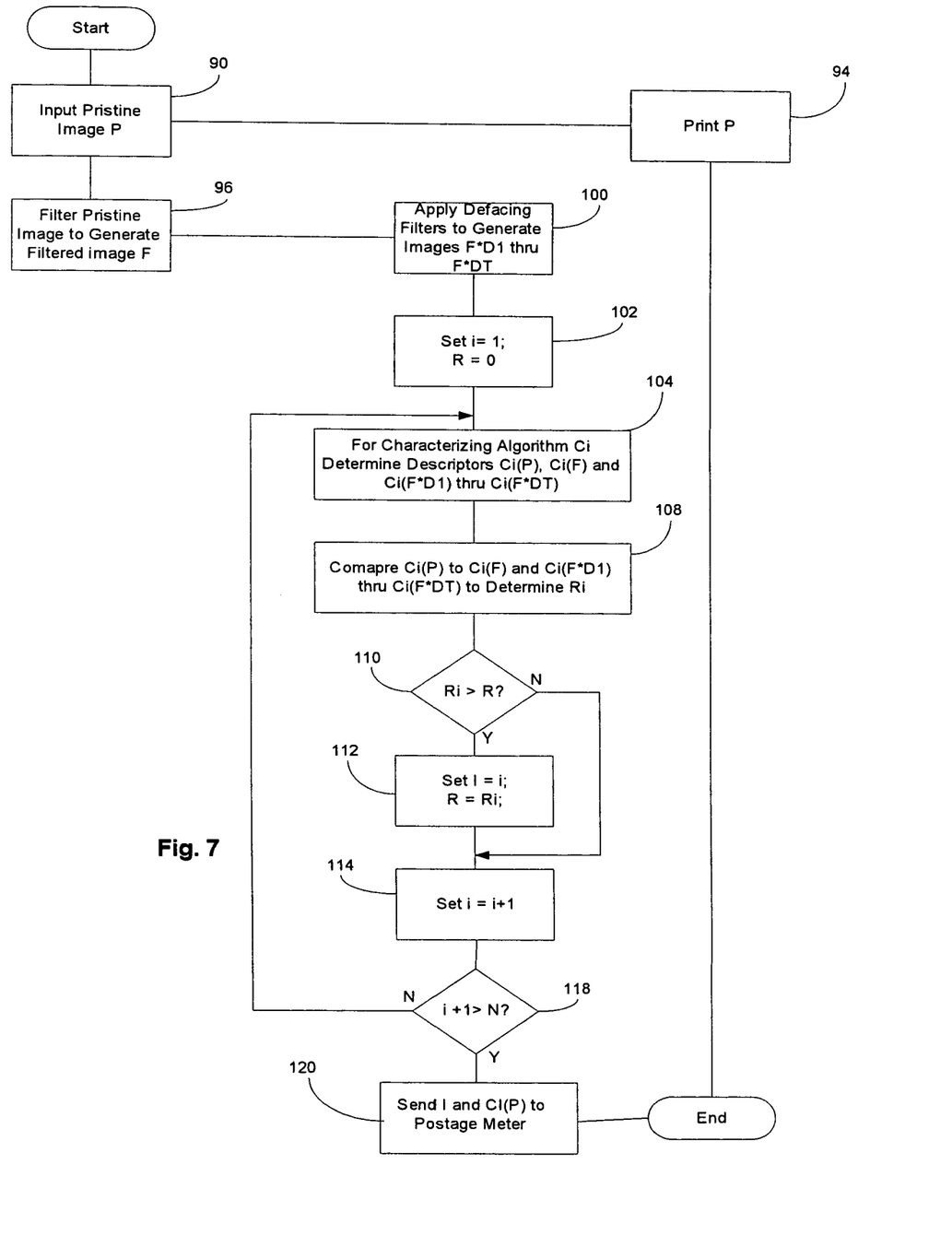
FIG. 7 shows a flow diagram of the operation of the operation of a controller comprised in the system of FIG. 2 in accordance with another embodiment of the subject invention.

FIG. 7 shows a flow diagram of the operation of controller 12 in accordance with another embodiment of the subject invention. Similarly to the above described embodiment, at step 90, controller 12 obtains pristine digital image, P, of address block A, at step 94 carries out printing of address block A concurrently with the selection of a characterizing algorithm and, at step 96 inputs a print/scan filter.

At step 100, controller 12 inputs defacing filters $D_1$ through $D_T$ (described above) and applies each of these filters to filtered image F to generate defaced images F*$D_1$ through F*$D_T$ which approximate scanned images of address blocks which have been defaced by occasional events such as blots. At step 102, controller 12 sets index i equal to 1 and variable R equal to 0.

At step 104 controller 12 applies the ith characterizing algorithm $C_i$ to images P, F and F*$D_1$ through F*$D_T$ to generate corresponding descriptors $C_i(P)$, $C_i(F)$ and $C_i(F*D_1)$ through $C_i(F*D_T)$; each comprising a sequence of M characterizations, or values, $C_i(P)_1$ through $C_i(P)_M$; $C_i(F)_1$ through $C_i(F)_M$, etc. Then at step 108, controller 12 compares descriptors $C_i(P)$ with descriptors $C_i(F)$ and $C_i(F*D_1)$ through $C_i(F*D_T)$ to estimate a robustness value $R_i$ for the ith algorithm $C_i$, with respect to a particular image P.

In a preferred embodiment, once descriptors $C_i(P)$ and $C_i(F)$ have been compared an estimate $R_i$ for the robustness of algorithm $C_i$, with respect to particular image P, is calculated as:

$R_i$=Total no. of: [$C_i(P)_j$ matching $C_i(F)_j$ (for j=1 through M)+$C_i(P)_j$ matching $C_i(F*D_k)_j$/M (for j=1 through M, k=1 through T)]/M(T+1);

where M is the number of characterizations generated by $C_i$.

Again, similar to the embodiment described above, once estimate $R_i$ is determined at step 110 controller 12 determines if $R_i$ is greater than variable R and, if so, at step 112 controller 12 sets R=$R_i$ and index value I=i. Then, or immediately if $R_i$ is not greater than R, at step 114 controller 12 sets i=i+1. At step 118 controller 12 determines if i+1 is greater than N, the number of characterizing algorithms stored. If not controller 12 returns to step 104 to test the next algorithm. Otherwise, at step 120 controller 12 sends I and descriptor $C_i(P)$ to meter 16 in a conventional manner for incorporation into indicium IN. The postal facility can then recover I to identify $C_i$ and use C, to validate indicium IN in a conventional manner.

In other embodiments, whether or not defacing filters are used, descriptor $C_i(F)$ can be incorporated into indicium IN.

It is anticipated that other estimates for robustness of characterizing algorithms will be developed as experience with different applications is gained or will be apparent to those skilled in the art. Accordingly it should be understood that, except for particular recitations in the claims below and equivalents thereof, details of particular estimates used form no part of the subject invention.

The embodiments described above and illustrated in the attached drawings have been given by way of example and illustration only. From the teachings of the present application those skilled in the art will readily recognize numerous other embodiments in accordance with the present invention. Accordingly, limitations on the present invention are to be found only in the claims set forth below.

What is claimed is:

1. A method for selecting a characterizing algorithm for generating a first characterizing information descriptor for a block of printed material on an object, wherein, at a location distant from where said block of printed material is printed, said block of printed material is to be scanned from an object, the block of printed material is to be used to generate a second characterizing information descriptor, the first characterizing information descriptor is to be retrieved from an indicium on the object, the retrieved first characterizing information descriptor and the second characterizing information descriptor are to be compared, the indicium is to be determined to be valid when the retrieved first characterizing information descriptor and the second characterizing information descriptor match to a particular extent, and the indicium is to be determined to be invalid when the retrieved first characterizing information descriptor and the second characterizing information descriptor do not match to the particular extent, said method comprising the steps of:

a) printing said block of printed material on the object;
    b) applying each characterizing algorithm from a predetermined set of characterizing algorithms to a pristine image of said block of printed material to generate a plurality of corresponding first characterizing information descriptors for said block of printed material;
    c) determining, by a computer system, estimates of robustness, with respect to said block of printed material, for each of said characterizing algorithms in said predetermined set to determine which of said characterizing algorithms has the highest estimate of robustness, wherein robustness is a measure of the extent to which a respective characterizing algorithm produces characterizing information descriptors that result in the same above determination of validity or invalidity of indicia for the pristine image of the block of printed material and the scanned image of the block of printed material after the block of printed material has been printed on the object, despite differences between the pristine image of the block of printed material and the scanned image of the block of printed material after the block of printed material has been printed on the object;
    d) selecting the characterizing algorithm with the highest estimate of robustness; and
    e) printing the indicium on the object, the indicium storing the first characterizing information descriptor generated by the characterizing algorithm with the highest estimate of robustness;
    wherein the block of printed material is text; and
    wherein all characterizing information descriptors are information, describing the block of printed material, which may be stored in the indicium but are not merely the indicium itself.

2. The method as described in claim 1 wherein said step c) comprises the sub-steps of:

c1) filtering said pristine image of said block of printed material with a print/scan filter to create a filtered image, said print/scan filter simulating the expected transformation of said pristine image by printing and scanning processes;
    c2) applying each characterizing algorithm from said predetermined set of characterizing algorithms to said filtered image to generate a plurality of corresponding third characterizing information descriptors for said filtered image; and
    c3) for each characterizing algorithm from said predetermined set of characterizing algorithms, comparing corresponding said first and said third characterizing information descriptors to determine which of said characterizing algorithms has the highest estimate of robustness.

3. The method as described in claim 2 wherein said object is a mail piece and said block of printed material represents an address.

4. The method as described in claim 3 wherein said indicium further stores information identifying said characterizing algorithm with the highest estimate of robustness.

5. The method as described in claim 1 wherein said object is a mail piece and said block of printed material represents an address.

6. The method as described in claim 5 wherein said indicium further stores information identifying said characterizing algorithm with the highest estimate of robustness.

7. The method as described in claim 1 wherein said step c) comprises the sub-steps of:

c1) filtering said pristine image of said block of printed material with a print/scan filter to create a filtered image, said print/scan filter simulating the expected transformation of said pristine image by printing and scanning processes;
    c2) further filtering said filtered image with one or more defacing filters, said defacing filters simulating blots, smudges, failure of print elements or scanner sensors, or other similar, occasional events which can not easily be incorporated into said print/scan filter to create one or more defaced images;
    c3) applying each characterizing algorithm from said predetermined set of characterizing algorithms to said filtered image and to said one or more defaced images to generate a plurality of corresponding third characterizing information descriptors for said filtered image and one or more pluralities of defaced image descriptors corresponding to each of said one or more defaced images; and
    c4) for each characterizing algorithm from said predetermined set of characterizing algorithms, comparing corresponding first characterizing information descriptors with corresponding third characterizing information descriptors and with each of said one or more corresponding defaced image descriptors to determine which of said characterizing algorithms has the highest estimate of robustness.

8. The method as described in claim 7 wherein said object is a mail piece and said block of printed material represents an address.

9. The method as described in claim 8 wherein said indicium further stores information identifying said characterizing algorithm with the highest estimate of robustness.

10. A secure indicia printing system for generating and printing an indicium storing a first characterizing information descriptor on an object, said object having other material printed thereon, wherein, at a location distant from where said other printed material is printed, the other printed material is to be used to generate a second characterizing information descriptor, the first characterizing information descriptor is to be retrieved from the indicium on the object, the retrieved first characterizing information descriptor and the second characterizing information descriptor are to be compared, the indicium is to be determined to be valid when the retrieved first characterizing information descriptor and the second characterizing information descriptor match to a particular extent, and the indicium is to be determined to be invalid when the retrieved first characterizing information descriptor and the second characterizing information descriptor do not match to the particular extent, comprising:
   a) a printer for printing said indicium;
   b) a processor for receiving a pristine digital image of said other printed material, and for processing said pristine digital image to extract characterizing information descriptive of aspects of said pristine digital image from said pristine digital image, said processor being programmed to:
      b1) apply each characterizing algorithm from a predetermined set of characterizing algorithms to said pristine digital image of said other printed material to generate a plurality of corresponding first characterizing information descriptors for said other printed material;
      b2) determine estimates of robustness, with respect to said other printed material, for each of said characterizing algorithms in said predetermined set to determine which of said characterizing algorithms has the highest estimate of robustness, wherein robustness is a measure of the extent to which a respective characterizing algorithm produces characterizing information descriptors that result in the same above determination of validity or invalidity of indicia for the pristine digital image of the other printed material and the scanned image of the other printed material after the other printed material has been printed on the object, despite differences between the pristine digital image of the other printed material and the scanned image of the other printed material after the other printed material has been printed on the object;
      b3) select the characterizing algorithm with the highest estimate of robustness; and
      b4) output the first characterizing information descriptor generated by the characterizing algorithm with the highest estimate of robustness; and
   c) a meter, said meter communicating with said processor to receive said first characterizing information descriptor generated by the characterizing algorithm with the highest estimate of robustness, and having a communications link for receiving other information from another information source and communicating with said printer, to:
      c1) cryptographically authenticate said first characterizing information descriptor generated by the characterizing algorithm with the highest estimate of robustness, and the other information;
      c2) generate said indicium to be representative of said cryptographically authenticated first characterizing information descriptor generated by the characterizing algorithm with the highest estimate of robustness, and the other information; and
      c3) control said printer to print said indicium on said object;
   wherein the other printed material is text; and
   wherein all characterizing information descriptors are information, describing the other printed material, which may be stored in the indicium but are not merely the indicium itself.

11. The secure indicia printing system as described in claim 10 wherein said processor is programmed to carry out said programming step b2) by:
   b2.1) filtering said pristine digital image of said other printed material with a print/scan filter to create a filtered image, said print/scan filter simulating the expected transformation of said pristine digital image by printing and scanning processes;
   b2.2) applying each characterizing algorithm from said predetermined set of characterizing algorithms to said filtered image to generate a plurality of corresponding third characterizing information descriptors for said filtered image; and
   b2.3) for each characterizing algorithm from said predetermined set of characterizing algorithms, comparing corresponding said first and said third characterizing information descriptors to determine which of said characterizing algorithms has the highest estimate of robustness.

12. The secure indicia printing system as described in claim 10 wherein said processor is programmed to carry out said programming step b2) by:
   b2.1) filtering said pristine digital image of said other printed material with a print/scan filter to create a filtered image, said print/scan filter simulating the expected transformation of said pristine digital image by printing and scanning processes;
   b2.2) further filtering said filtered image with one or more defacing filters, said defacing filters simulating blots, smudges, failure of print elements or scanner sensors, or other similar, occasional events which can not easily be incorporated into said print/scan filter to create one or more defaced images;
   b2.3) applying each characterizing algorithm from said predetermined set of characterizing algorithms to said filtered image and to said one or more defaced images to generate a plurality of corresponding third characterizing information descriptors for said filtered image and one or more pluralities of defaced image descriptors corresponding to each of said one or more defaced images; and
   b2.4) for each characterizing algorithm from said predetermined set of characterizing algorithms, comparing corresponding first characterizing information descriptors with corresponding third characterizing information descriptors and with each of said one or more defaced image descriptors to determine which of said characterizing algorithms has the highest estimate of robustness.

* * * * *